United States Patent

Sakamoto et al.

[11] Patent Number: 6,017,599
[45] Date of Patent: Jan. 25, 2000

[54] LAMINATED SHEET AND MANUFACTURING METHOD THEREOF

[75] Inventors: Yoshiki Sakamoto; Kenji Yasunaka, both of Hikari; Atsuo Tanaka, Tokuyama; Satoshi Iketaka, Kudamatsu, all of Japan

[73] Assignee: Toyo Kohan Co., Ltd., Tokyo, Japan

[21] Appl. No.: 08/592,387

[22] PCT Filed: Jul. 29, 1994

[86] PCT No.: PCT/JP94/01260

§ 371 Date: Feb. 1, 1996

§ 102(e) Date: Feb. 1, 1996

[87] PCT Pub. No.: WO95/04653

PCT Pub. Date: Feb. 16, 1995

[30] Foreign Application Priority Data

Aug. 4, 1993 [JP] Japan .................................. 5-213470

[51] Int. Cl.[7] .................................................. B29D 22/00
[52] U.S. Cl. ...................... 428/35.8; 428/457; 428/458; 428/461; 428/463; 428/212; 156/311; 156/321; 264/544; 220/450; 220/454
[58] Field of Search ..................... 428/457, 458, 428/460, 461, 462, 463, 412, 418, 34.6, 34.7, 34.8, 35.8, 480; 220/450, 454; 264/148, 153, 544; 156/309.66, 309.9, 311, 322, 321

[56] References Cited

U.S. PATENT DOCUMENTS

| 3,898,358 | 8/1975 | Ryan et al. | 428/156 |
| 4,276,347 | 6/1981 | Shimada | 428/332 |
| 4,943,780 | 7/1990 | Redding | 428/35.9 |
| 5,059,460 | 10/1991 | Heyes et al. | 428/35.3 |
| 5,112,695 | 5/1992 | Watanabe et al. | 428/458 |
| 5,204,181 | 4/1993 | Suzuki et al. | 428/349 |
| 5,330,605 | 7/1994 | Tanaka et al. | 156/309.9 |
| 5,384,354 | 1/1995 | Hasegawa et al. | 524/539 |
| 5,582,319 | 12/1996 | Heyes et al. | 220/454 |

*Primary Examiner*—Paul Thibodeau
*Assistant Examiner*—D. Lawrence Tarazano
*Attorney, Agent, or Firm*—Browdy and Neimark

[57] ABSTRACT

A laminate of an oriented resin film and a metal sheet substrate is used in the manufacture of can stock, the intensity of orientation of the resin film being greater along the bottom of the can and lesser along the can side wall. This construction is obtained by locally cooling, during lamination, that part of the heated metal substrate which will become the bottom wall of the resultant can.

11 Claims, 8 Drawing Sheets

Fig. 1
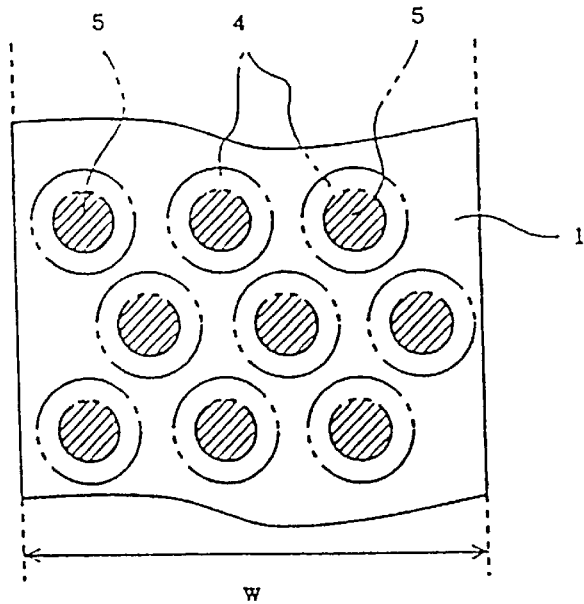
Fig. 2(a)
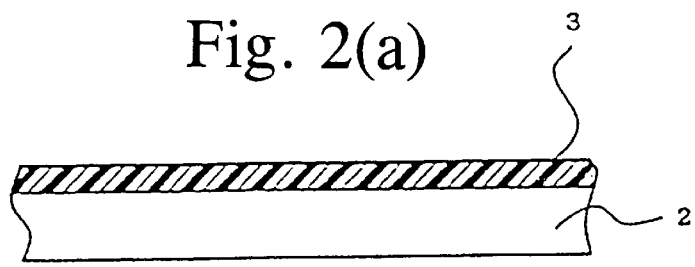
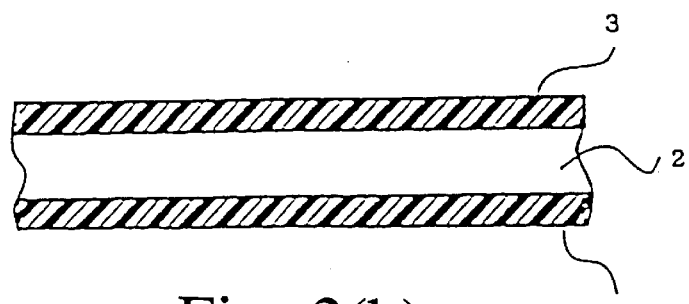
Fig. 2(b)

Fig. 3
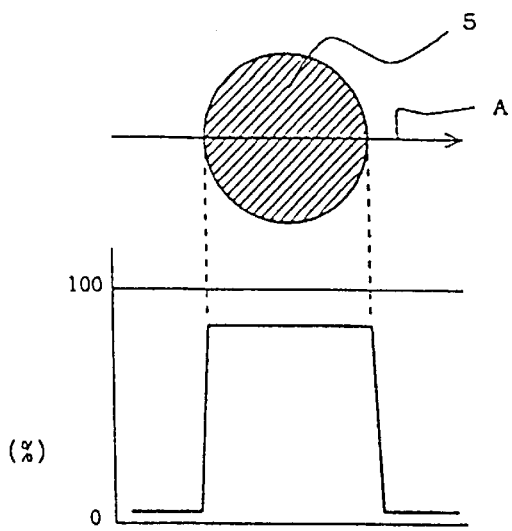
Fig. 4(a)    Fig. 4(b)
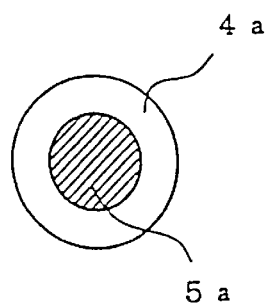    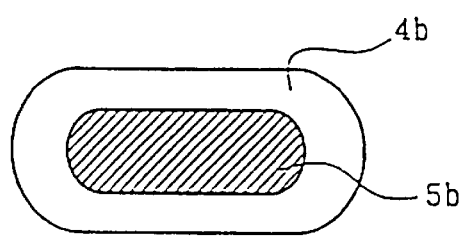
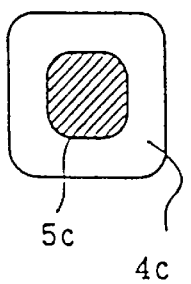    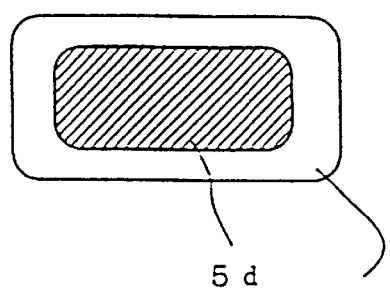
Fig 4(c)    Fig. 4(d)

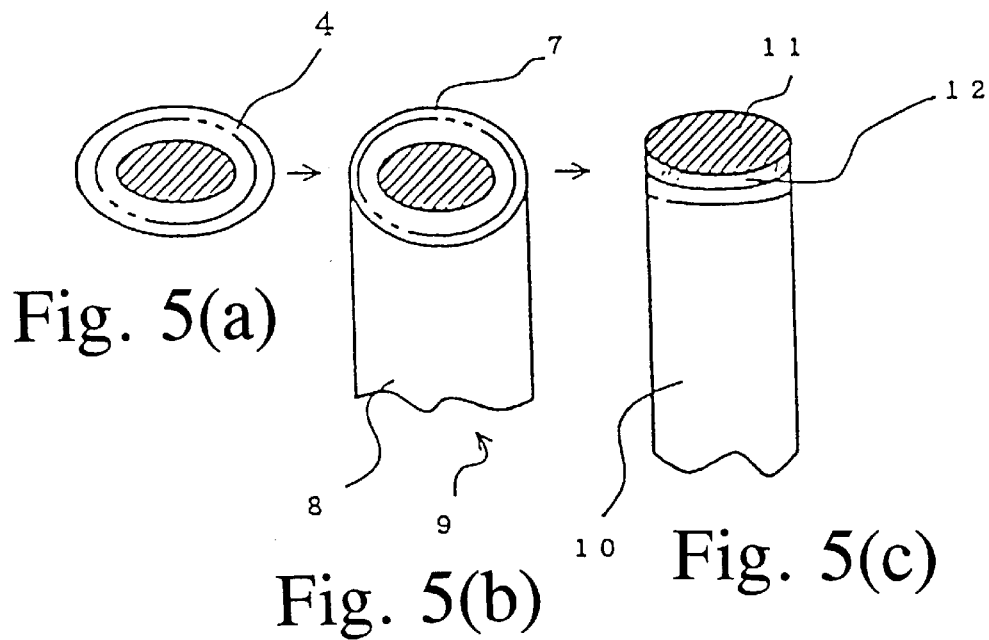
Fig. 5(a)
Fig. 5(b)
Fig. 5(c)
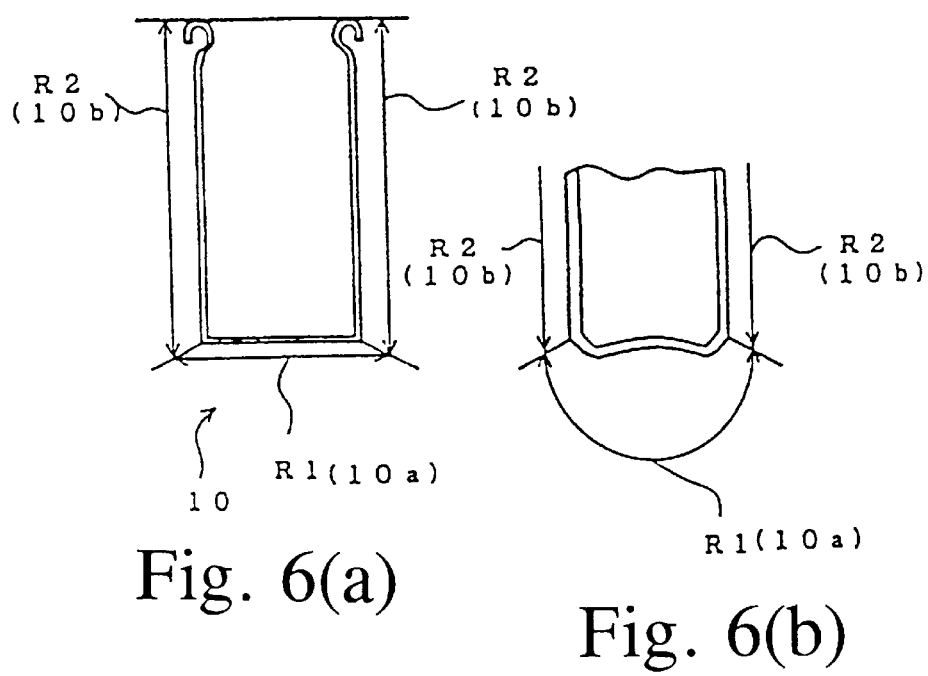
Fig. 6(a)
Fig. 6(b)

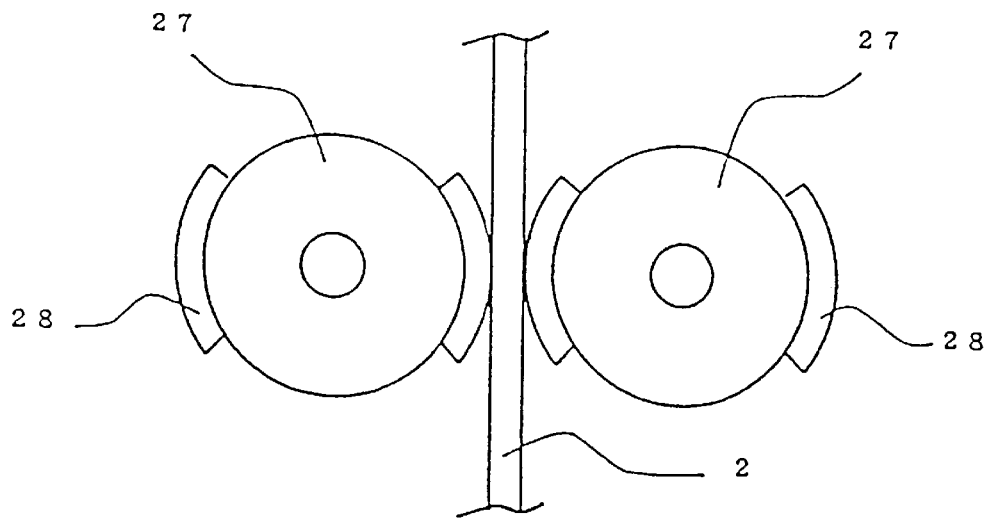
Fig. 9
Fig. 10
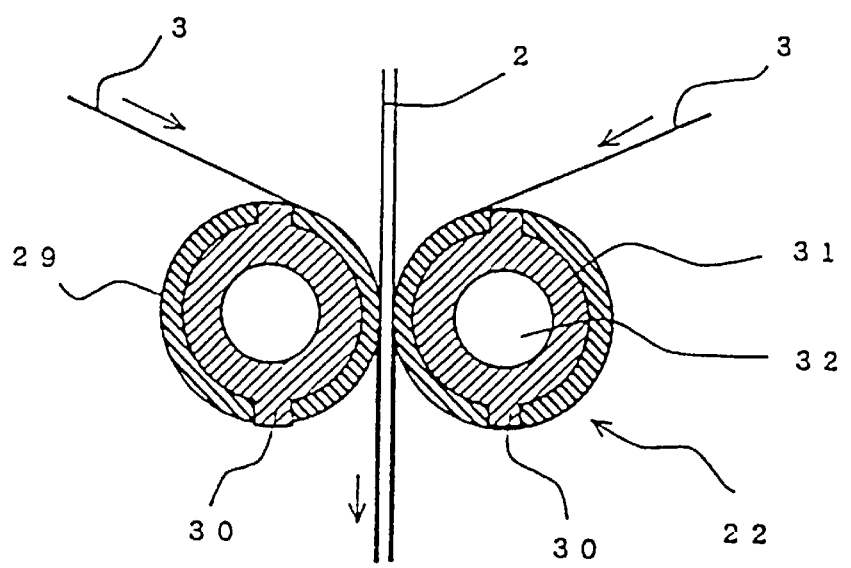

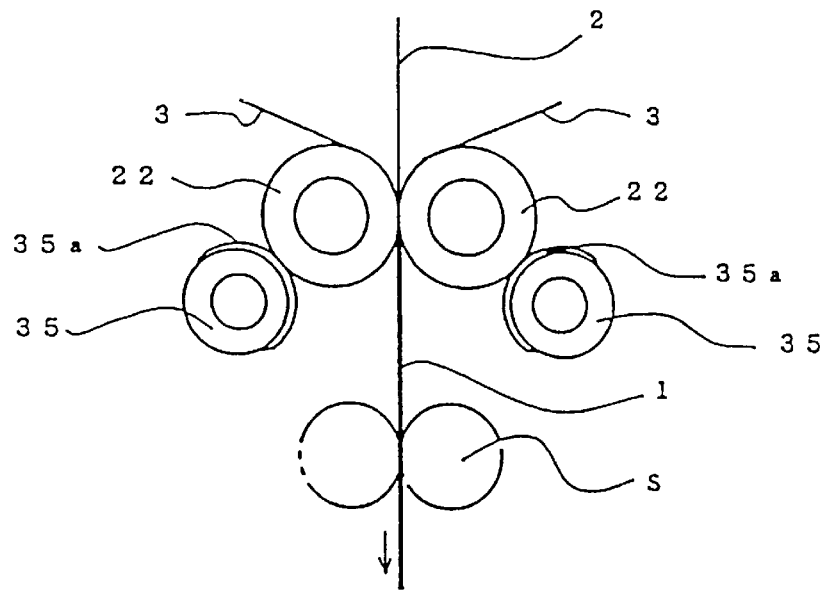
Fig. 13
Fig. 14
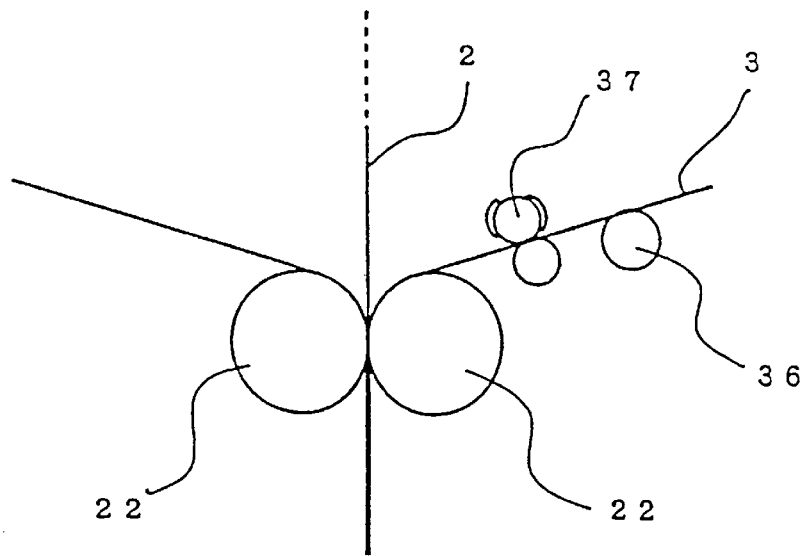

LAMINATED SHEET AND MANUFACTURING METHOD THEREOF

TECHNOLOGICAL FIELD

This invention concerns laminated sheet and a manufacturing method for it. This invention especially concerns a laminated sheet for beverage or food cans and an efficient manufacturing method therefor. The laminated sheet includes a thermoplastic the resin film and metallic substrate.

BACKGROUND TECHNOLOGY

A two piece can which consists of the can body combined with the bottom lid is used for the manufacture of a food can or beverage can. Those cans are formed from a metal substrate such as a cold rolled steel sheet, an aluminum sheet or tinplate. Those cans are usually coated with various resin coatings in order to prevent the metal from being dissolved into the contents of the can and to improve its corrosion resistance and durability.

The above-mentioned two-piece can is occasionally formed by means of drawing the laminated sheet which is produced by laminating the resin film to the metal substrate. Such laminated sheet should endure the drawing, the pressing or the stretching processing.

Therefore, the laminated sheet is conventionally produced by a method of laminating the resin film without using adhesive (Japanese patent Application No. TOKU-KOU-SHO 60-47103) or by a method of laminating a polyester film which is coated with epoxy resin together with curing agent, etc. (e.g. Japanese Application NO. TOKU-KOU-SHO 63-13829 or No. TOKU-KAI-HEI 1-249331).

One of the requirements is denting resistance in the drawn and formed can. There must be impact resistance of the film and also resistance to cracking of the film when the can is dented.

We have previously proposed to use the steel sheet covered with bi-axially oriented or un-oriented polyester resin film which has a specified intrinsic viscosity as a material of the laminated can (Japanese Patent Application No. TOKU-KAI-HEI 4-224936).

Above-mentioned bi-axially oriented polyester resin film improves the strength and the denting resistance because the crystalline structure is highly oriented (the molecule is highly oriented). However, such a polyester film does not have enough adhesion to the metal substrate. Therefore it peels off easily during drawing process or ironing (e.g. pressing) process.

In order to solve such problems, the resin film is laminated to the metal substrate which is heated in advance. As a result, the crystal orientation of the film on the side of the oriented film in contact with the metal substrate decreases to some degree. And, adhesion and bonding improve.

So this is a method of giving the inclination in the direction of thickness of the film concerning crystal orientation. However, the denting resistance of the can decreases when crystal orientation of the film decreases too much and it causes a problem concerning the durability of the can.

In order to improve adhesion, it has been proposed that the film of laminated sheet be partially heated, especially for the high adhesion required part, just before the drawing process (Japanese patent application No.TOKU-KAI-HEI 4-118121). However, it is difficult to control and maintain the film temperature within the range from the glass transition temperature to the temperature of re-crystallization.

SUMMARY OF INVENTION

This invention relates to a laminated sheet for a metal can, which laminated sheet has excellent denting resistance and adhesion to the can, and the method of manufacturing the laminate.

The laminated sheet according to the present invention improves denting resistance of the part of the can where considerable denting is likely to occur such as the can bottom, etc., and also improves the adhesion of the film to the metal substrate in the other parts of the laminate.

Furthermore, that laminated sheet can be simply formed into cans and the damage at the time of circulation is small and durability is high.

BRIEF EXPLANATION OF DRAWING

FIG. 1 is a projected drawing which shows one example of the laminated sheet of the present invention.

FIG. 2(a) is an magnified cross section of the laminated sheet and

FIG. 2(b) is an expanded cross section which shows other example of the laminated sheet of the present invention.

FIG. 3 is an explanation drawing which shows the transition of X-ray diffractive intention which corresponds to the degree of crystal orientation of the laminated film.

FIGS. 4(a)–(d) are projected drawings which show the example of the blank present invention, respectively.

FIGS. 5(a)–(c) illustrates progression of the process of producing the can from the laminated sheet shown in FIG. 1.

FIG. 6(a) is the lengthwise cross section which shows laminated can produced by the method shown in FIG. 5, and FIG. 6(b) is the lengthwise cross section of the additionally formed laminated can.

FIG. 9 is a cross section which shows an example of the cooling roll used for the manufacturing method of the laminated sheet of the present invention.

FIG. 10 is a cross section which shows an example of the ruminating roll used for the manufacturing of the laminated sheet of the present invention.

FIG. 13 is a process chart which shows another examples of the manufacturing method of the laminated sheet of the present invention.

FIG. 14 is a process chart which shows the other example of the manufacturing method of the laminated sheet of the present invention.

THE BEST MANNER TO PRACTICE THE PRESENT INVENTION

Figure 7:
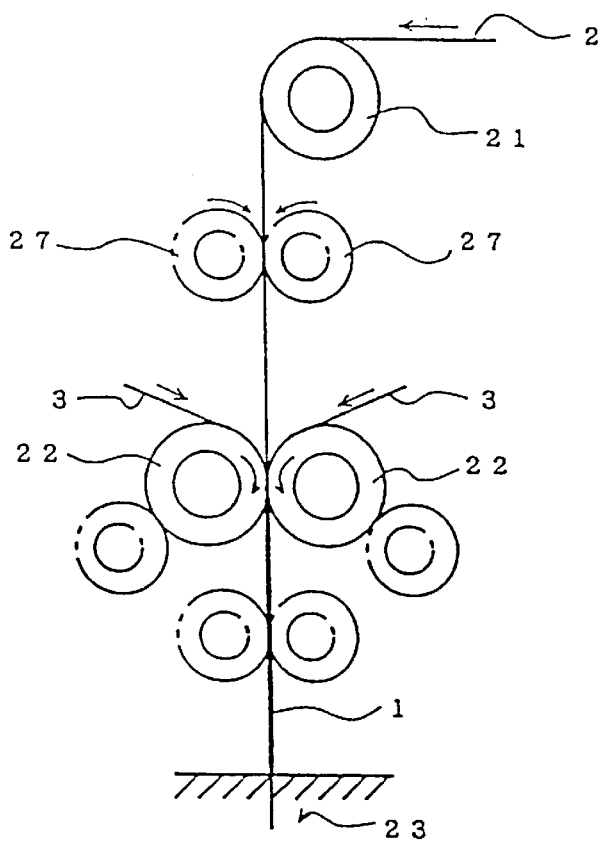
FIG. 7 is a process chart which shows an example of the manufacturing method of the laminated sheet of the present invention.

Next, the laminated sheet of the present invention and an example of the manufacturing method are explained referring to each Figure.

The laminated sheet 1 shown in FIG. 1 consists of the metal substrate 2 and the resin film 3 laminated on one of its surfaces as shown in FIG. 2(a).

The laminated sheet 1 is provided in the form of a coiled strip having a constant width W.

In some cases, there can be the adhesive between the metal substrate 2 and the resin film 3.

In addition, resin film 3 can be laminated to both sides of the metal substrate as shown in FIG. 2(b).

The above mentioned laminated sheet 1 having constant width W is punched out into disk blanks 4 to provide a series of disk blanks from which to form the cup-shaped cans, and the three disk blanks in each line are zigzagingly punched out with constant difference.

The imaginary outline of the blank pattern is shown on the laminated sheet 1.

The center part 5 of each blank 4 (shown by hatching) corresponds to the bottom of the can when the blank is formed into a cup shape, and the crystal orientation of the resin film is high at this location. However, it is low in other parts.

The shape of blank 4 can be designed in any shape according to the final product to be formed.

For instance, as shown in FIGS. 4(a)–(d), the shape of high crystal orientated part corresponding to the bottom of the final cup, which is circle 5(a), oval 5(b) square 5(c) or rectangle 5(d) is designed in the blank for a cylindrical cup, oval cup, square cup or rectangular cup. In the present invention, any other shapes are available.

The thickness of the metal substrate 2 can be changed according to the kind of metal, and to the usage of the container or the container size. Generally, a metallic sheet is desirable from 0.10 to 0.50 mm in thickness and is excellent especially from 0.15 to 0.40 mm in thickness.

Various surface treated steel sheet and aluminum, etc. are used as a metal substrate.

First of all, surface treated steel sheet is explained. The surface treated steel sheet is made of cold-rolled steel sheet, which is annealed and secondly cold-rolled. The cold-rolled steel sheet is surface treated by one of the following treatment groups consisting of electrolytical chromium coating and chromate treatment, etc.

The cold-rolled sheet is treated with one or more kinds of these surface treatments. One of the suitable surface treated steel sheet types is electrolytically chromium coated steel sheet (TFS). Especially preferable is one having a double layer consisting of a lower metallic chromium layer having 10 to 200 mg/m$^2$ of metallic chromium and an upper hydrated chromium oxide layer having 1 to 50 mg/m$^2$ of chromium.

In the case where polyester film is laminated to the steel substrate, it is preferable that the hydrated chromium oxide layer has 3–50 mg/m$^2$, especially 7–25 mg/m$^2$ of metallic chromium. The laminated polyester film on the electrolytically chromium coated steel sheet is excellent in adhesion and corrosion-resistance.

One of the other surface treated steel sheet types is tinplate coated with 0.5–11.2 g/m$^2$ of tin. This tinplate should be coated with 1 to 30 mg/m$^2$ hydrated chromium oxide formed by chromate treatment or chromate-phosphate treatment.

In addition, one of the other examples is aluminum coated steel sheet which gives aluminum plated or aluminum laminated steel sheet.

Besides pure aluminum, an aluminum alloy sheet can be used as the light metal sheet. An aluminum alloy excellent in corrosion-resistance and formability is one comprising 0.2–1.5 wt % of Mn, 0.8–5 wt % of Mg, 1.25–0.3 wt % of Zn and 0.15–0.25 wt % of Cu.

These light metal substrates can be treated by organic or inorganic treatments.

The above-mentioned resin film 3 is made from a molecular oriented thermoplastic resin and a higher crystal orientated one is more preferable.

The resin film should be oriented in only the lengthwise direction (uniaxial) or in the lengthwise and width direction (bi-axial), unlike film which is formed only by drawing after being formed into extruded film.

The above-mentioned degree of crystal orientation can be measured from the height of the peak of an X-ray diffraction pattern. Moreover, it is possible to be measured optically by an Abbe refractometer.

The method by which the degree of the crystal orientations is calculated from the peak height of X-ray diffraction pattern is shown as follows. Concretely, (100) plane parallel to the film surface is scanned by means of X rays and the diffracted intensity is measured. And the crystal orientation is calculated as the ratio of the diffracted intensity of X-ray to that of before lamination.

The laminated film of the present invention should have more than 90% of crystal orientation at the place corresponding to the bottom of the can and have about 5% of crystal orientation at the other parts.

FIG. 3 shows the transition of the degree of crystal orientation.

When X-rays are continuously scanned across part 5 (where crystal orientation is high), which corresponds to the bottom, in the direction of arrow A, the diffraction intensity of X-ray is obtained as shown in FIG. 3.

That is, the degree of the crystal orientation of the film laminated to the metal substrate and deformed into the illustrated cup-shape, becomes about 95% in part 5 which corresponds to the bottom of the can, and it is about 5% in the other parts.

Wherever the film thickness of the formed can is in the range of 5 to 20 μm, the resin film having crystal orientation previously mentioned can have excellent heat resistance, strength and permeation resistance. Therefore, the resin film should be one which can be crystal oriented (molecularly oriented) and be suitably oriented by heating, drawing, redrawing and ironing.

The following resins can be used as the film material of the present invention, for example, an olefin resin such as polyethylene, polypropylene, and ethylene propylene copolymer, ethylene acrylic ester copolymer and ionomer.

Also available are polyester resins such as polyethylene terephthalate, polybutylene terephthalate, ethylene terephthalate/isophthalate copolyester, ethylene terephthalate/adipate copolyester, ethylene terephthalate/sebacate copolyester and butylene terephthalate/isophthalate copolyester; polyamide resins such as nylon 6, nylon 66, nylon 11 and nylon 12; polyvinyl chloride; polyvinylidene chloride; polycarbonate resins such as poly-p-xyleneglycol biscarbonete, poly-dioxydiphenyl ethane carbonate, poly-dioxdiphenyl 2,2-propane carbonate, poly dioxydiphenyl 1,1-ethane carbonate, high nitrile resins such as acrylonitrile-butadiene copolymer with the high content of nitrile, acrylonitrile-styrene copolymer, polystyrene copolymer etc., which satisfy preceding conditions.

In the present invention, all the above-mentioned resins can be used.

An especially suitable resin film is one consisting of polyester, which mainly comprises the recurring unit of ethylene terephthalate, and is bi-axially oriented.

Polyester resin should be the one in which 75–95% recurring consists of ethylene terephtalate units and 5–25% remainder consists of units of another ester.

Other acid components than terephthalic acid which can be used are phthalic acid, isophthalic acid, succinic acid, azelaic acid, adipic acid, sebacic acid, dodecanic acid, diphenyl carboxylic acid, 1,4 cyclohexane dicarboxylic acid, trimellitic anhydride acid and one or more kinds of these acids.

Other alcohol components which can be used are saturated polyhydric alcohol such as 1,4 butanediol, 1,5 pentanediol, 1,6 hexanediol, propyleneglycol, polytetramethyceneglycol, trimethylene glycol, triethylene glycol, neopentylglycol, 1,4 cyclohexanedimethanol, trimethylolpropane, pentaerythritol, and one or more kinds of these alcohols.

The ester unit, except ethylene terephthalate, can be any acid component and any polyhydric alcohol except the combination of the ethylene telephthalate and ethylene glycol.

Copolyester can be made from the above acid component and a polyhydric alcohol.

These copolyester resin can be produced by blending copolymerized polyester with ethylene terephthalate, melting them and then copolymerizing them by transesterification.

When the polyester resin film of which intrinsic viscosity, IV value, is about 0.50 to 0.70 is used, the laminated metallic sheet has excellent denting resistance in the body part of drawn and stretch formed can of the present invention.

The polyester resin can have added to it stabilizer, antioxidant, anti-static, pigment, filler for lubricating, and corrosion inhibitor as occasion demands.

Although it is not particularly restricted, suitable thicknesses of the polyester film used in the present invention are 5 to 50 $\mu$m. When the thickness of the film is 5 $\mu$m or less, the laminating process is remarkably difficult and sufficient corrosion resistance after forming cannot be obtained. Also, when the thickness becomes 50 $\mu$m or more, the cost of the can is more expensive than conventional cans coated with epoxy resin.

When an adhesive agent is between the metallic substrate 2 and the resin film 3, the laminated sheet has excellent adhesion and corrosion resistance. This adhesive agent also has excellent adhesion to the resin film. This adhesive consists of epoxy resin and curing agent resin such as phenol resin, amino resin, acrylic resin, vinyl resin, and urea resins. The suitable adhesive is an epoxy phenol coating, a vinyl chloride vinyl resin, or an organosol coating which consists of copolymerized vinyl chloride resin and epoxy resin.

The thickness of the adhesive layer should be 0.1–5 $\mu$m.

As shown in FIG. 2(b), when the resin film 3 is laminated on both sides of the metal substrate, the outer side resin film can be pigmented. This pigment conceals the metallic color of substrate and stabilizes the blank holder force to prevent a metal substrate from wrinkling in drawing or redrawing.

The inorganic pigment is as follows:

Inorganic white pigments such as rutile type or anatase type titanium dioxide, zinc dioxide, and gross white.

White pigments such as perlite, precipitated sulphuric perlite, calcium carbonate, gypsum, precipitated silica, aerosil, talc, burned or non-burned kaolin, barium carbonate, alumina, white synthetic or natural mica, synthetic calcium silicate and magnesium carbonate.

Black pigments such as carbon black and magnetite, etc.

Red pigments such as Indian red, etc.

Yellow pigments such as sienna, etc.

Blue pigments such as ultramarine and cobalt blue, etc.

Five to 500% by weight of these pigments can be blended for film resin. Especially, it is preferable to be blended at the rate of 10–300% by weight.

In the above laminated sheet 1, the resin film 3 is marked to detect the higher crystal oriented part 5 in order to laminate the resin film 3 separating the higher crystal oriented part (5) and lower oriented part. The high orientated part 5 is detected by this mark and punched out into the disk blank 4 as shown in FIG. 5(a).

The punched blank 4 is drawn by die and punch, and is formed into the temporary metallic cup 9 which has the bottom 7 with fixed diameter and sidewall 8 with fixed height as shown in FIG. 5(b).

The metallic cup 9 is redrawn several times and finally becomes the laminated can 10 which has fixed height and the diameter shown in FIG. 5(c).

The higher crystal oriented part 5 corresponds to the whole bottom 11 of this laminated can.

This is shown by the oblique lined part extending even to the edge 12 of the can sidewall in FIG. 5(c).

FIG. 6(a) shows the distinction of each of the areas. The area indicated by R1 corresponds to the higher crystal oriented part 5 in laminated sheet 1 shown in FIG. 6(a). The area shown with R2 corresponds to the lower crystal oriented part.

The laminated can shown in FIG. 6(a) is an example of a laminated can of the present invention. The laminated can 10 is domed at the bottom and the domed part 10A is formed as shown in FIG. 6(b). In addition, the laminated can is trimmed, printed, cured, necked, and flanged, and shaped into the final laminated can.

In case of producing the drawn and ironed can, the laminated can is formed by ironing the drawn or redrawn cup. In ironing as mentioned above, the side wall 10b is severely processed. Because that part has the lower crystal oriented resin film, the film adheres well to the metallic substrate. Therefore, laminated film is not easily de-laminated.

The bottom 10a and its marginal part often knock against other cans in transport. That part has higher crystal orientated resin film and has excellent denting resistance. Therefore, cracks are not easily caused on the resin film in the inner wall.

Because the bottom 10a is less processed, de-lamination is not caused even if the laminated film is highly oriented. Therefore, whole can has excellent durability.

Next, the manufacturing method of the laminated sheet which has higher and lower crystal orientation in the laminated film of the present invention is explained through the FIG. 7 to 15.

FIG. 7 shows a heating roll 21 to heat metal substrate 2 as strip. A pair of laminating rolls 22 are arranged below the heating roll 21 in order to laminate the metal substrate 2 and two resin films 3 which are located on both sides of the metallic substrate. A water bath 23 is arranged below the pair of laminating rolls 22 to quench the laminated sheet.

After being uncoiled from the uncoiler, the metal substrate 2 is heated by the heating roll 21 and turned downwardly.

In addition, the metal substrate 2 runs through between the couple of laminating rolls 22 and enters the water bath 23 for quenching. The resin film 3 is supplied from the above part of laminating roll 22 and is laminated to the metallic substrate 2 by the pair of laminating rolls 22. The heating roll 21 of the above-mentioned laminating facility has the shape shown in FIG. 8.

The heating pipes 24 are arranged in the heating roll 22 to circulate the heating medium such as heated water or oil in the direction of the roll axis. Those heating pipe 24 are not passed through area Z which corresponds to the higher crystal orientated part in the laminated sheet 1 shown in FIG. 1. That is, heating pipe 24 which penetrates from a left axis 25 to the right axis 26 of heating roll 21 passes the vicinity of surfaces of heating roll 21 except for areas Z. The heating pipe 24 passes the center part of the heating roll 21 in area Z and the heat conduction is intercepted by a heat insulator.

A cooling pipe which sends cooling water to area Z can be arranged. When the metallic substrate 2 is heated by above heating roll 21, the temperature of metal substrate is raised except in the part of the substrate coming in contact with areas Z. Therefore, the crystal orientation of the film 3 decreases at all parts of the film which come into contact with the heated metal substrate 2 except the parts contacting areas Z when resin film 3 becomes laminated onto the heated metal substrate 2 and is passed through laminating rolls 22.

Moreover, the crystal orientation of the film contacting the relatively cool area Z is kept near in original orientation. Therefore, the higher crystal oriented circular part 5 is partially formed on the laminated sheet 1, and the other area has the lower crystal orientation.

Figure 8:
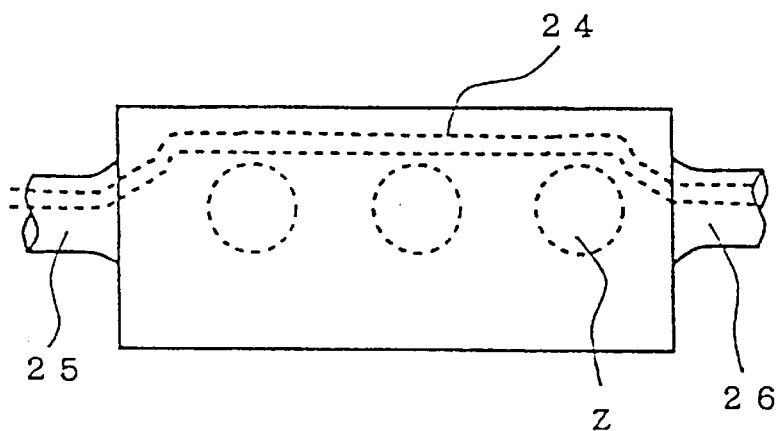
FIG. 8 is a front view which shows an example of the heating roll used for the manufacturing the laminated sheet of the present invention.

In order to produce the disk blank pattern when the higher crystal oriented part 5 is zigzagingly arranged as shown in FIG. 1, area Z on the opposite side of the heating roll 21 shown in FIG. 8 must be located with constant difference in the direction of the roll axis.

The surface temperature of the above-mentioned heating roll 21 is different according to the material and the thickness of resin film 3. For instance, in using bi-axially oriented polyester film, the higher temperature part is about 210–260° C. and area Z is about 170–230° C.

The laminating speed is about 150 m/min in the case of the general laminating method.

An induction heating roll, heating pipe roll or jacket heating roll can be used as heating roll which heats metal substrate 2.

Cooling rolls 27 shown in FIG. 9 partially cool the metal substrate 2 which is uniformally heated by the above-mentioned heating roll 21. The cooling rolls 27 are arranged on both sides of the metallic substrate 2 below the heating roll 21 as shown in FIG. 7, or a cooling roll 27 may be located on only one side of the moving substrate 2. The cooling roll 27 is made of the high heat conductivity metal such as aluminum.

A projecting part 28 is arranged on the cooling roll 27 as shown in FIG. 9. This projecting part 28 contacts to the metal substrate 2 which has been heated by the heating roll 21, and cools it. In the case of using this cooling roll 27, the heating roll 21 can be one which heats whole area of the metal substrate 2. The pattern of projecting part 28 is the same as the area shown in FIG. 8.

Such cooling rolls 27 can also cause the desired temperature distribution on the surface of the metal substrate 2. And the degree of the crystal orientation of the resin film 3 laminated to the metal substrate 2 can be changed in the direction of the plane.

FIG. 10 shows the case where each of the laminating rolls 22 has an insulating part 29 and cooling part 30 on its surface. Such insulating part 29 can be composed of a rubber lining of the same type as in a general laminating roll. The cooling part 30 can be composed of an exposed metallic part 31 extended from the center of the roll. The cooling part 30 and insulating part 29 have a continuously smooth and cylindrical surface. The metallic part 31 in the laminating roll 22 can have a cavity 32 for the passage therethrough of cooling medium such as cooling water.

The cooling roll 27 shown in FIG. 9 can be given the rubber lining same as laminating roll 22 and its surface temperature therefore can be partially changed.

Figure 11:
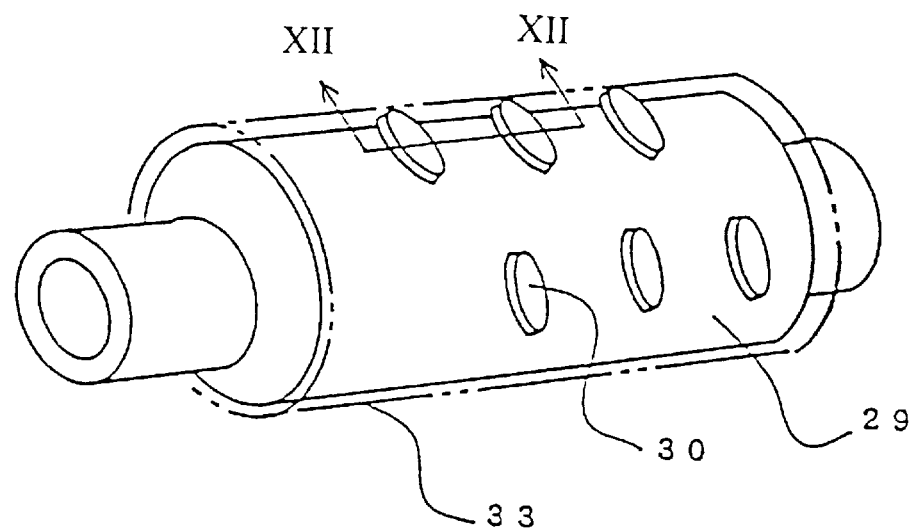
FIG. 11 is a perspective drawing of the cooling roll shown in FIG. 9.

FIG. 11 shows the perspective drawing of the cooling roll 27 shown in FIG. 9 (or laminating roll shown in FIG. 10) to indicate the projecting part 28 (or the cooling part 30) clearly. The circular projecting part 28 (or the cooling part 30) is arranged according to the specified pitch P (see FIG. 12). The lines of these projecting parts 28 are zigzagingly arranged with constant difference in the direction of the roll axis as shown in FIGS. 1 and 11.

The metal substrate 2 is partially cooled by the cooling roll 27. This metal substrate 2 and resin film 3 are laminated by the pair of laminating rolls 22, and are laminated together as shown in FIG. 1. The imaginary line 33 in FIG. 11 indicates the outline drawing of the laminating roll which is covered with rubber. All parts except the projecting part 28 are insulated by means of the lining rubber such as shown in FIG. 10.

Figure 12:
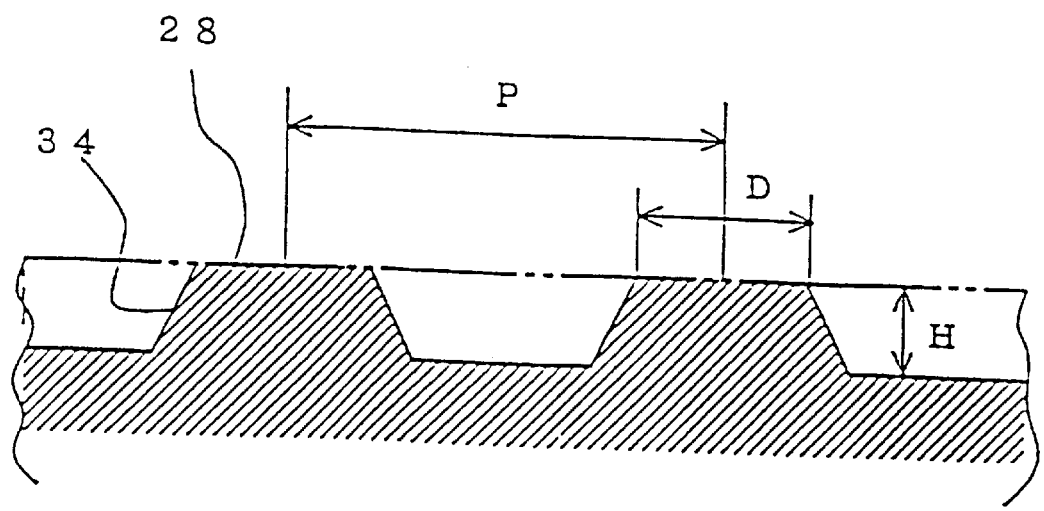
FIG. 12 is a XII—XII line cross section of FIG. 11.

FIG. 12 shows XII—XII line cross section of FIG. 11. The projecting part 28 (or cooling part 30) is composed of the cylindrical projection surrounded by tapered face 34. The diameter D of the projecting part 28 is decided according to the diameter of the bottom of the laminated can produced by above-mentioned method.

In the case where the diameter of the blank is 179 mm, for instance, the diameter D of the projecting part 28 is 65 mm. For instance, the pitch P is assumed to be 310 mm. The height H of the projecting part 28 is about 3 to 5 mm.

FIG. 13 shows another example, and laminating roll 22 is the same as a conventional one. The laminating roll 22 is partially cooled by the cooling roll 35. The metal substrate 2 and resin film 3 are laminated by partially cooled laminating rolls. The construction of the cooling roll 35 is the same as those shown in FIGS. 11-12. The projecting part 35a of the cooling rolls 35 to cool selected locations of the adjacent heating roll 22 is arranged on the surface of the cooling roll 35.

In above examples, the metal substrate 2 is partially heated by heating roller and partially cooled by the cooling roll before laminating such as shown in FIG. 7. Or higher and lower temperature parts are formed on the metal substrate directly by laminating roll 22 such as shown in FIG. 3.

The imaginary outline S in FIG. 13 shows another example, and it indicates that the laminated sheet 1 is partially cooled just after laminating. At that time, the cooling roll used is the same as above cooling roll 28.

All examples mentioned above indicate the common method to change the temperature of the metal substrate or laminated sheet partially, i.e. in selected areas, and consequently the distribution of the crystal orientation of the laminated resin film changes in the planar direction.

Figure 15:
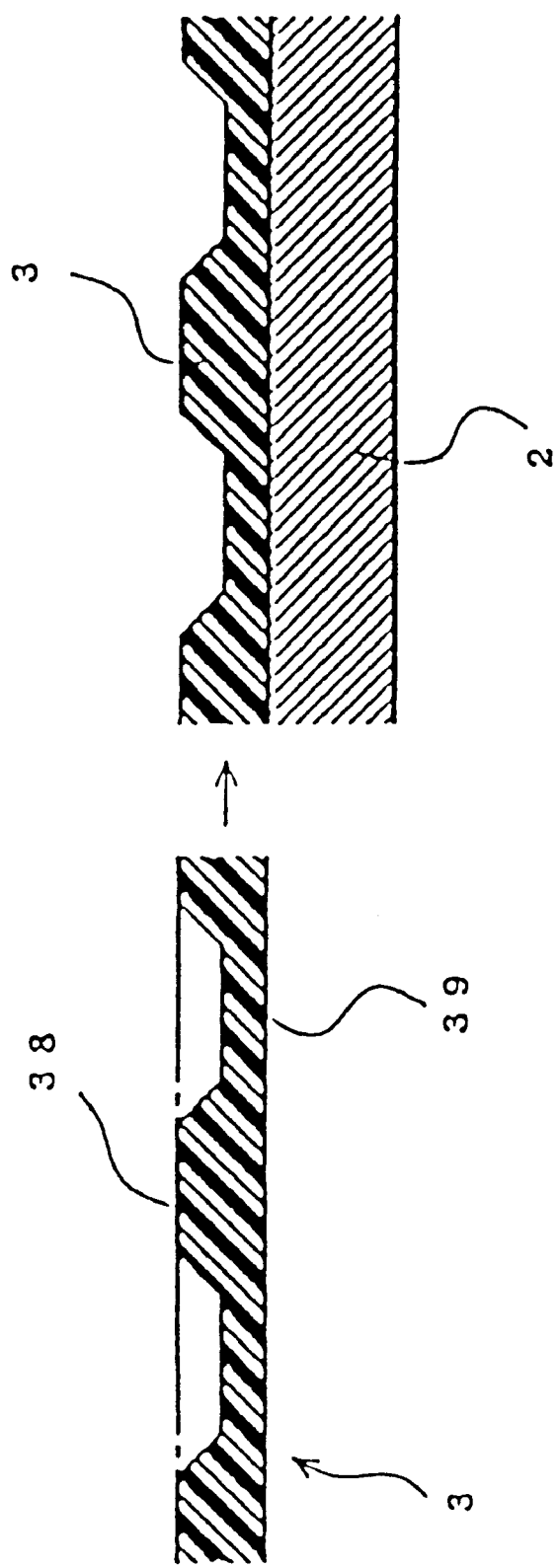
FIG. 15 is a magnified cross section of the resin film and the metal substrate laminated by the method shown in FIG. 14.

FIG. 14 schematically shows how to produce the laminated sheet with same property as described above by means of partially changing the thickness of the resin film 3. Before laminating, the resin film 3 is heated by preheating roll 36 in advance and runs through the pair of pattern rolls 37 which have the projecting or depressing parts. As a result and as shown in FIG. 15, thick parts 38 and thin parts 39 are formed in the resin film 3. When such a resin film 3 and metal substrate 2 are laminated by conventional laminating rolls, the thick parts 38 of the film are heated to a lesser degree than the thin parts 39, so that the thick parts 38 of the film have a higher crystal orientation. To the contrary, the crystal orientation of the thin parts 39 of the film decrease because those parts reach a higher temperature.

The surface of the laminated sheet 1 with thin and thick parts of the resin film 3 is smoothed through the drawing and ironing as shown in FIG. 5 whereby roughness of the laminated film does not stand out.

The thickness of each part of previous resin film is decided according to the product. Usually the part subject to denting has a thickness of about 5 to 50% of the original thickness of the resin film.

Next, a concrete example and a comparison example are given and the effect of the laminated sheet of the present invention is explained.

EXAMPLE 1

Tin free steel which was 0.175 mm in thickness and 960 mm in width was used as a metal substrate. Bi-axially oriented polyethylene terephthalate resin films were laminated to both side of that metallic substrate by the laminating apparatus as shown in FIG. 7. An adhesive of epoxy resin was provided between the metal substrate and the film. The thickness of the film was 25 μm and the thickness of the adhesive layer was 0.8 μm.

At the laminating, the circular low temperature parts of diameter of 80 mm were zigzagingly arranged by the pitch 131 mm on the heating roll as shown in FIG. 1.

The other conditions of the laminating were the same as the conventional method.

EXAMPLE 2

In the laminating process, cooling rolls were used. The other conditions were same as example 1, and the laminated sheet was produced by means of example 2.

EXAMPLE 3

The cooling part was arranged on the laminating roll. The other conditions were same as example 1, and the laminated sheet was produced by means of example 3.

COMPARISON EXAMPLE 1

A polyethylene terephthalate resin film with a high crystal orientation was laminated to and over the same metallic substrate as example 1. That laminated film had constant crystal orientation over all parts.

COMPARISON EXAMPLE 2

A polyethylene terephthalate with a low crystal orientation such as undrawn film was laminated to the same metal substrate as example 1. That laminated film had constant crystal orientation over all parts.

The above laminated sheet was drawn and redrawn by means of the method shown in FIG. 5 and was formed into the laminated can. The bottom of that can was 65 mm in diameter. Whether de-lamination occurred in the laminated can or not was evaluated by visual observation.

The denting resistance was evaluated by the following method. The laminated can was filled with water and then the was seamed on it. In addition, the packed can was dropped from a height of 15 cm.

The film crack of the dented part was evaluated by enamel rater value (ERV) measuring method. ERV measuring method is explained as follows. A brine solution of about 3% is poured into the above can after it has fallen, dented and opened. And a stainless steel stick is immersed into it as cathode.

Next, voltage of 6.3 volt's is applied between the can which is anode and the stainless steel stick cathode. At this time in case of the metal is exposed through the crack in the film, the current flows between both poles.

The results are shown in table 1.

TABLE I

| The degree of de-lamination | The denting resistance (ERV current value) |
| --- | --- |
| example 1 | None 0 (insulated) |
| example 2 | None 0 (insulated) |
| example 3 | None 0 (insulated) |
| compersion example 1 | |
| large de-lamination in upper part of can | 0 (insulated) |
| compersion example 2 | |
| None | 1.25 mA |

The cans of example 1–3 did not have any de-lamination and had excellent denting resistance as shown in Table 1.

On the other hand the can of comparison example 1 had excellent denting resistance. However, a large de-lamination occurred in the upper part of the can.

Moreover, a film crack occurred remarkably in the dented part on the can of comparison example 2 though de-lamination was not generated.

The laminated resin film which uniformally has the low crystal orientation has inferior denting resistance and never de-laminated.

On the contrary, the laminated resin film which uniformally has the high crystal orientation has superior denting resistance and de-laminates at much area.

When the laminated sheet which consists of metal substrate and resin film is drawn or ironed, the extensional deformation or the shrinkage deformation in the substrate is caused according to the degree of the processing. Then, if the lightly crystal oriented part is set to the highly processed part, the laminated sheet has excellent adhesion. As a result, de-lamination is hardly caused.

As the laminated resin film was elongated with metallic substrate, the higher the crystal orientation of the film becomes, the greater the film is drawn in the processing.

On the contrary, the highly oriented part is set to the lightly processed part. As a result, the orientation of the film of the can increases in a whole can after forming. That laminated can has excellent denting resistance and corrosion resistance.

For instance, when the laminated sheet is used as a material of the two piece can, the film corresponding to the bottom of the can should have the high crystal orientation.

The film in the sidewall where the degree of the processing is high should have the low crystal orientation.

When the resin film which has high crystal orientation is laminated to the metal substrate, and high and low temperature part were given to the metal substrate or laminating roll, the crystal orientation of the film which contacts with the high temperature part decreases. And the crystal orientation of the film which contacts low temperature part is kept as original.

The same effect is achieved also when the laminated sheet passes through the laminating roll cooled partially. When the temperature of the film partially changes according to fixed pattern, the same effect is achieved. The resin film which has the high orientation is preheated and the thin or thick part is formed immediately before laminating. Then the temperature of the thin part rises and the crystal orientation decreases. On the contrary, the temperature of the thick part does not rise so much and the crystal orientation is kept as original.

Industrial Possibility

The laminated sheet of the present invention has the highly or lightly crystal oriented part of the resin film according to the fixed pattern.

The de-lamination of the film is suppressed and the denting resistance of the can is superior.

The laminated sheet of the present invention is for the use of can manufacture, and de-lamination of the severely processed side wall is suppressed.

Moreover the bottom of the can has excellent denting resistance.

When the resin film is laminated to the metal substrate, the pattern of the high crystal orientation of the film can be set according to the manufacturing method of the present invention.

Summary

The laminated sheet of the present invention consists of the metallic substrate and oriented thermoplastic resin film, and the laminated film has the high or low crystal orientated part in the plane direction according to uniform pattern.

Therefore, the low orientated part corresponding to the sidewall of the can has excellent formability and the high orientated part corresponding to the bottom has excellent denting resistance.

The manufacturing method of the present invention is about the laminating process.

When the metallic substrate and the resin film are laminated, the any pattern of the high crystal orientation of the laminated film can be set.

What is claimed is:

1. A method of manufacturing a deformable laminated sheet, wherein the sheet comprises a metal substrate and a crystal oriented thermoplastic resin film laminated to said metal substrate such that the degree of crystal orientation of said resin film varies over surface of the sheet; those areas of the sheet which are to be lightly deformed having a higher degree of orientation than those areas of the sheet intended to be more heavily deformed when the deformable sheet is formed into a three-dimensional object; said method of forming said laminate sheet comprising:

heating the metal substrate, contacting said heated metal substrate with a biaxially oriented thermoplastic resin film and pressing said resin film to said metal substrate to provide a laminate, and preferentially cooling portions of the metal substrate or the laminate to decrease the loss of orientation of the thermoplastic resin film in those areas which are to have a higher degree of crystal orientation.

2. A method according to claim 1, wherein preferential cooling is carried out on said metal substrate or said laminate by a roller having a surface with relatively hot areas and relatively cool areas, said relatively cool areas corresponding in area to said preferentially cooled portions of said metal substrate or said laminate.

3. A method according to claim 1, wherein preferential cooling of said metal substrate at said preferentially cooled portions is carried out by a cooling roll after said metal substrate has been heated.

4. A method according to claim 1, wherein preferential cooling is carried out simultaneously with said pressing, said pressing and said preferential cooling being carried out by a laminating roll having a prescribed cooling pattern on its surface corresponding with said preferentially cooled portions.

5. A method of manufacturing a deformable laminated sheet used in the production of a can, wherein the sheet comprises a metal substrate and a crystal oriented thermoplastic resin film laminated to said metal substrate such that the degree of crystal orientation of said resin film varies over surface of the sheet; an area of the sheet intended to be more lightly deformed to form the bottom of a can having a higher degree of orientation than an area intended to form the side of the can; said method of forming said laminate sheet comprising:

heating the metal substrate, contacting said heated metal substrate with a biaxially oriented thermoplastic resin film and pressing said resin film to said metal substrate to provide a laminate, and preferentially cooling portions of the metal sheet or the laminate to decrease the loss of orientation of the thermoplastic resin film in the area which has a higher degree of crystal orientation and is intended to be used to form the bottom of a can.

6. A method of manufacturing a deformable laminated sheet, wherein the sheet comprises a metal substrate and a crystal oriented thermoplastic resin film laminated to said metal substrate such that the degree of crystal orientation of said resin film varies over surface of the sheet; those areas of the sheet which are to be lightly deformed having a higher degree of orientation than those areas of the sheet intended to be more heavily deformed when the deformable sheet is formed into a three-dimensional object; said method of forming said laminate sheet consisting essentially of:

heating the metal substrate;

locally varying the temperature of said resin film using a cooling device having a prescribed cooling pattern, and immediately pressing said resin film and said metal substrate together using a pair of laminating rolls until said metal substrate and said resin film adhere to each other.

7. A method of manufacturing three-dimensional articles from a deformable laminated sheet, wherein the sheet comprises a metal substrate and a crystal oriented thermoplastic resin film laminated to said metal substrate such that the degree of crystal orientation of said resin film varies over surface of the sheet; those areas (1) of the sheet which are lightly deformed having a higher degree of orientation than those areas (2) of the sheet which are to be heavily deformed; said method of manufacturing said articles comprising:

deforming said laminated sheet so that areas (1) of said laminated sheet having a higher degree of orientation are lightly deformed and areas (2) of said laminated sheet having a lower degree of orientation are heavily deformed.

8. A method of manufacturing a can from a deformable laminated sheet, said can having a bottom and a side wall, wherein the sheet comprises a metal substrate and a biaxially oriented thermoplastic resin film laminated to said metal substrate such that the degree of biaxial orientation of said resin film varies over the surface of the sheet; an area (3) of the sheet intended to form the can bottom having a higher degree of biaxial orientation and being more lightly deformed than an area (4) having a lower degree of orientation intended to form the can side wall; said method of manufacturing said can comprising:

deforming said laminated sheet into a can such that said area (3) of said laminated sheet having a higher degree of orientation is lightly deformed into said can bottom and said area (4) of said laminated sheet having a lower degree of orientation is heavily deformed into said can wall.

9. A can having a bottom and side wall, said bottom and side wall being unitary and comprising a deformed laminated sheet of a metal substrate and a crystal oriented thermoplastic resin film laminated to said metal substrate;

said resin film having a higher degree of crystal orientation at said can bottom and lower degree of crystal orientation at said can side wall.

10. A method of manufacturing a deformable laminated sheet, wherein the sheet comprises a metal substrate and a biaxially oriented thermoplastic resin film laminated to said metal substrate such that the degree of biaxial orientation of said resin film varies over surface of the sheet; those areas of the sheet which are to be lightly deformed having a higher degree of orientation than those areas of the sheet intended to be more heavily deformed when the deformable sheet is formed into a three-dimensional object; said method of manufacturing said laminated sheet comprising:

heating the metal substrate, contacting said heated metal substrate with a biaxially oriented thermoplastic resin film and pressing said resin film to said metal substrate to provide a laminate, and locally cooling portions of the metal substrate or the laminate with a cooling roll provided with a cooling part having a pattern corresponding to portions of said laminate to be locally cooled to decrease the loss of orientation of the thermoplastic resin film in those areas which are to have a higher degree of crystal orientation.

11. A deformable laminated sheet for the manufacture of products by deformation of said laminated sheet, comprising:

a metal substrate and a crystal oriented thermoplastic resin film laminated to said metal substrate, wherein the degree of crystal orientation of said resin film varies over the surface of the laminated sheet;

those areas of the sheet which are to be lightly deformed having a higher degree of orientation than those areas of the laminated sheet intended to be more heavily deformed when the deformable sheet is formed into a three-dimensional products.

* * * * *